United States Patent [19]

Freeman et al.

[11] Patent Number: 4,712,710
[45] Date of Patent: Dec. 15, 1987

[54] ONE-PIECE SEAMLESS ENCLOSURE AND METHODS OF MAKING IT

[75] Inventors: Richard B. Freeman, Wilmington, Del.; Charles W. Goetz, Willingboro, N.J.; Walter S. Eggert, Jr., Huntington Valley, Pa.

[73] Assignee: The Budd Company, Troy, Mich.

[21] Appl. No.: 19,849

[22] Filed: Feb. 27, 1987

Related U.S. Application Data

[63] Continuation of Ser. No. 663,626, Oct. 22, 1984, abandoned.

[51] Int. Cl.⁴ ............................................. B65D 25/18
[52] U.S. Cl. .................................... 220/414; 220/74; 220/72; 220/75
[58] Field of Search ..................... 220/414, 74, 75, 72

[56] References Cited

U.S. PATENT DOCUMENTS

| | | | |
|---|---|---|---|
| 3,854,620 | 12/1974 | Saidla | 220/414 |
| 3,874,544 | 4/1975 | Harmon | 220/414 |
| 3,989,562 | 11/1976 | Hladik et al. | 220/414 |
| 4,344,543 | 8/1982 | Hoffman | 220/414 |
| 4,391,301 | 7/1983 | Pflederer | 220/414 |
| 4,552,281 | 11/1985 | Schneider | 220/414 |

Primary Examiner—Joseph Man-Fu Moy
Attorney, Agent, or Firm—E. M. Farrell; Herman Foster; T. I. Davenport

[57] ABSTRACT

Methods and means for providing a one-piece seamless enclosure include a plurality of panels each having a foam core surrounded by a fiber reinforced cloth or woven material. The panels are joined inside of an outer mold. An inner inflatable mold is inserted into the area between the panels and pressurized. Resin is pumped into the cavity between the inner and outer molds and then cured. The molds are removed and a one piece seamless enclosure or shelter is provided.

1 Claim, 8 Drawing Figures

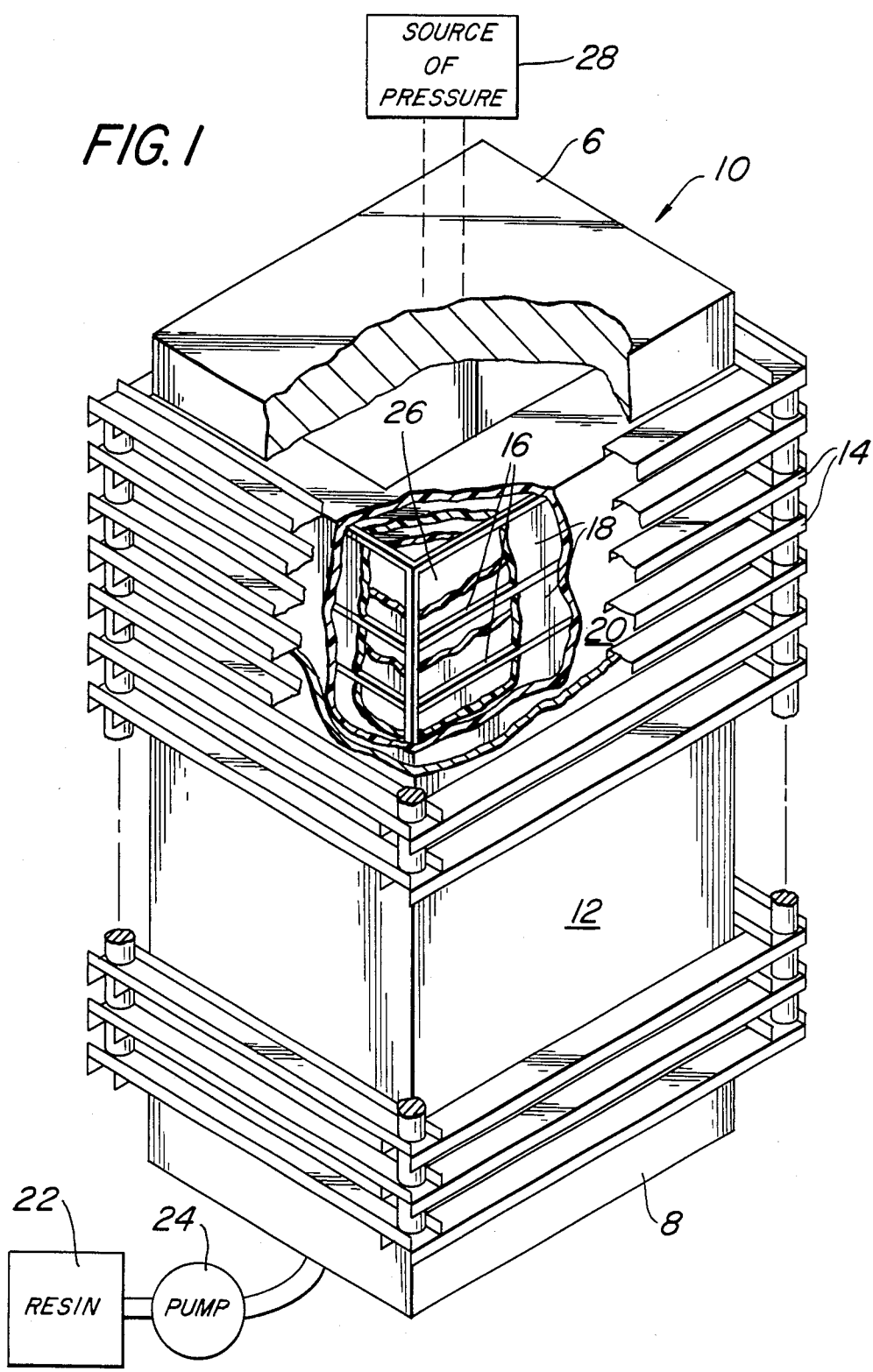

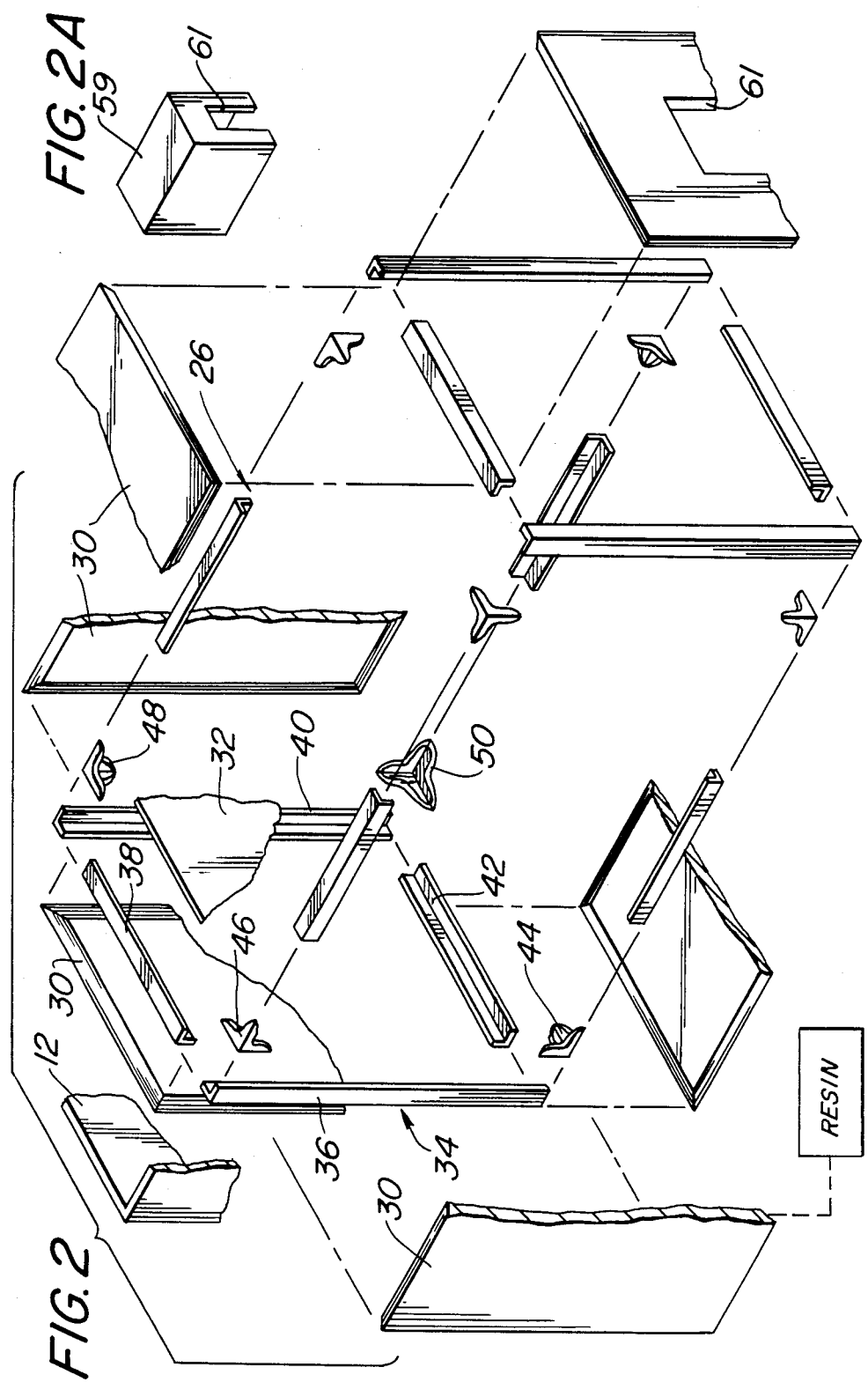

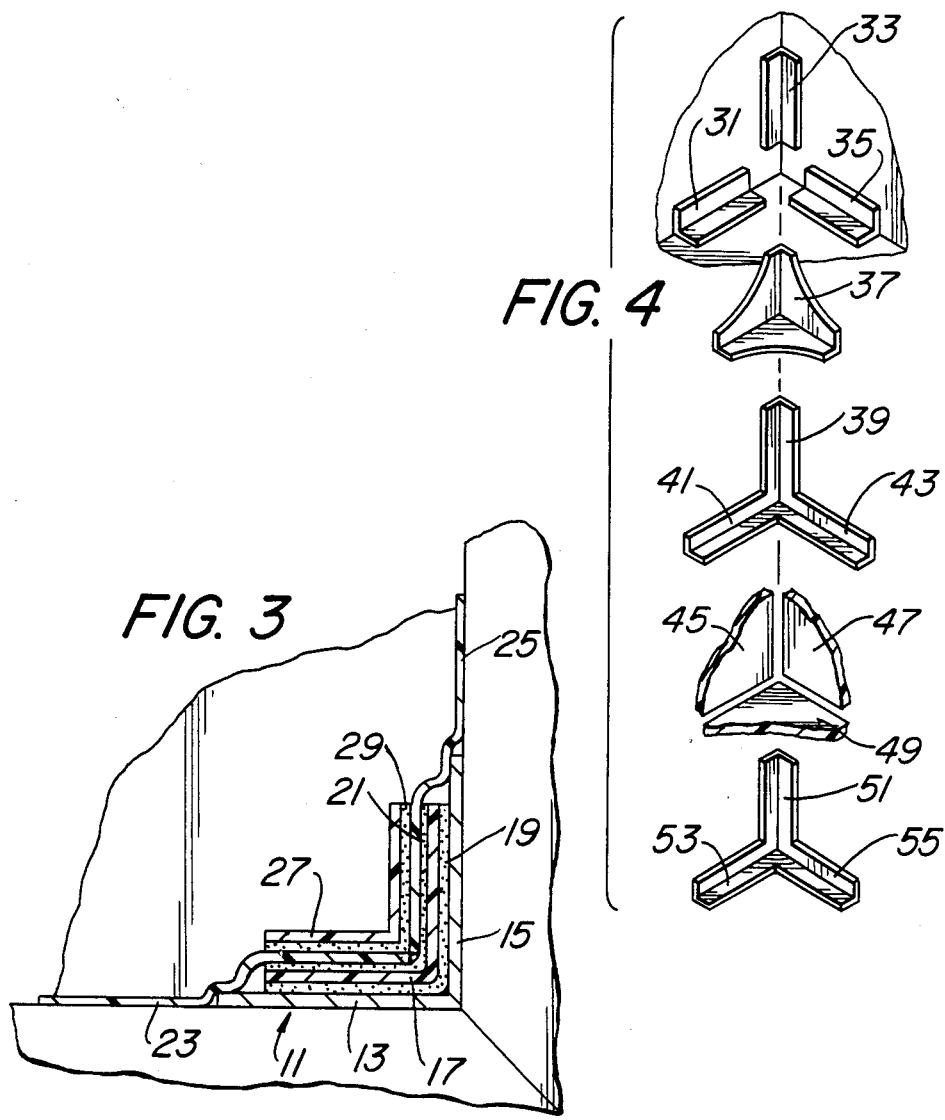

ONE-PIECE SEAMLESS ENCLOSURE AND METHODS OF MAKING IT

This application is a continuation application of Ser. No. 663,626 filed Oct. 22, 1984, now abandoned.

BACKGROUND OF THE INVENTION

Enclosures are generally designed to be fabricated using various components subsequently joined together; corner joints and other seams have to be sealed to prevent environmental damage.

OBJECTS OF THE INVENTION

It is an object of this invention to provide a novel one-piece seamless enclosure and method of making same.

It is a further object of this invention to provide an improved enclosure which does not require corner joints or other seams which have to be sealed to protect it against the environment.

It is a further object of this invention to provide an improved one-piece seamless construction having high thermal insulation.

BRIEF SUMMARY OF THE INVENTION

In accordance with the present invention, an enclosure or shelter of a plurality of sides is fabricated into a single seamless unit. Six or more individual panels, in a preferred embodiment, include foam cores completely surrounded by fiber reinforced cloth or woven material, such as fiberglass. The panels have mitered edges for subsequent nesting of the panels in the corners of the enclosure or shelter. In manufacturing, a rigid outer mold and an inflatable and collapsible mold are provided on opposite sides of the panels. After the inner mold is pressurized, resin is pumped into the cavity between the molds to impregnate the fibrous material surrounding the panels. The resin is then cured and the molds are dismantled to permit removal of the enclosure.

Other objects and advantages of the present invention will be apparent and suggest themselves to those skilled in the art from a reading of the following specification and claims taken in conjunction with the accompanying drawings.

BRIEF DESCRIPTION OF THE DRAWINGS

FIG. 1 is an isometric view illustrating a molding system for molding a one-piece seamless enclosure, in accordance with the present invention;

FIG. 2 is an exploded view illustrating some of the main elements illustrated in FIG. 1;

FIG. 2A is an isometric view of a finished enclosure, in accordance with the present invention;

FIG. 3 is a cross-sectional view illustrating the corner connections for the inner mold illustrated in FIG. 2;

FIG. 4 is an exploded view illustrating some of the elements of FIG. 3; and

DESCRIPTION OF THE INVENTION

Figure 5:
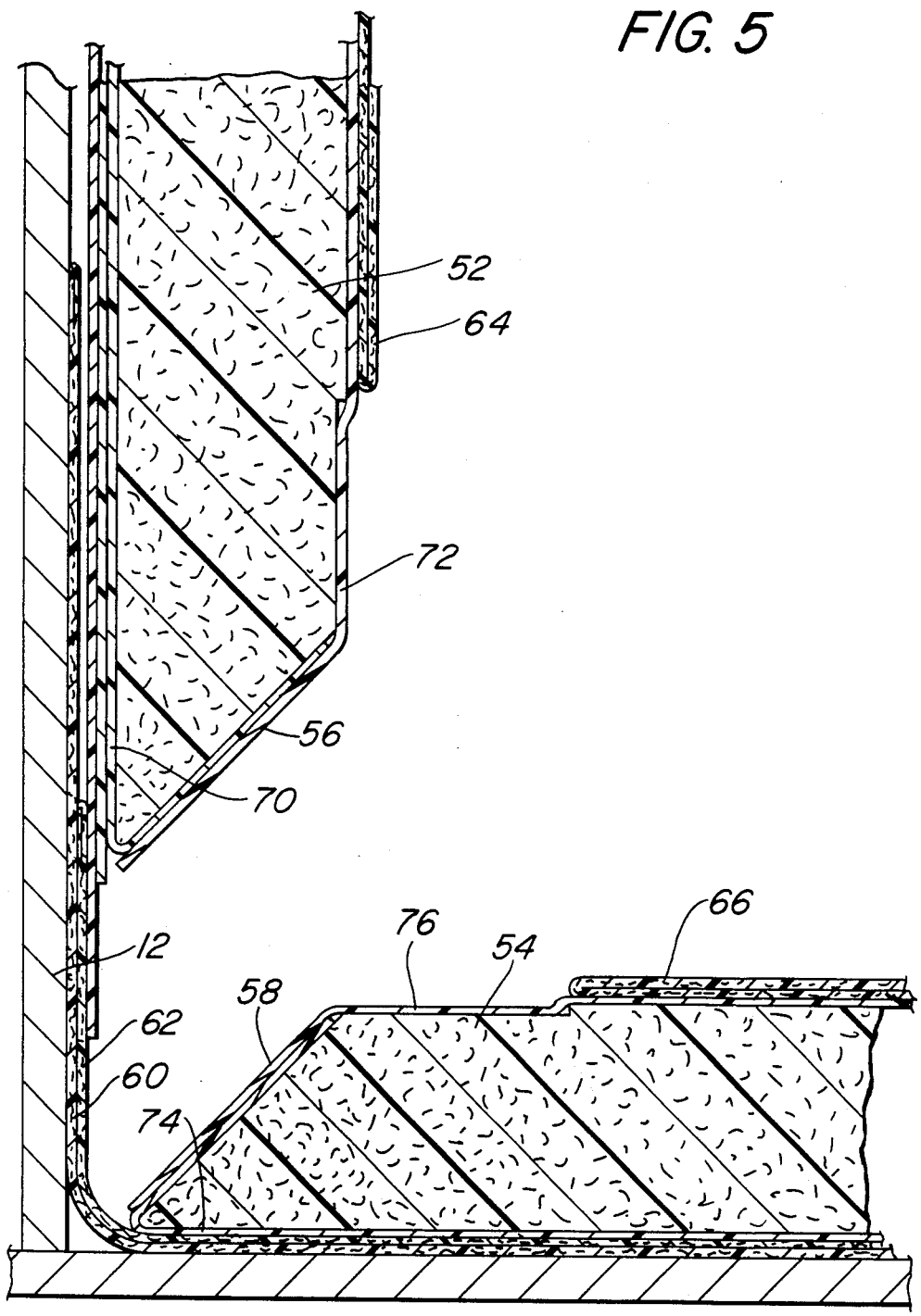
FIGS. 5, 6 and 7 illustrate the steps in joining two of the six panels used to form the enclosure, in accordance with the present invention.

The making of an integral one-piece enclosure of the present invention requires inner and outer molds disposed on opposite sides of foam core panels having fibrous outer skins with the edges of the foam panels in physical contact with each other. Resin under pressure is then injected into the cavity between the inner and outer molds. The resin impregnates the skins of the panels. After curing the resin a one-piece enclosure is formed and the inner and outer molds are removed.

Referring to FIG. 1, an outer mold 10 comprises a rigid aluminum sheel 12, a strong reinforcement frame 14, top member 6 and bottom member 8. The top and bottom members may take different forms and may be held firmly in place by external forces or tied together by cables (not illustrated). Six foam panels, formed by high density foam frame 16 and low density foam material 18, are located at their edges inside of the aluminum shell 12. The foam panels each include an outer skin 20.

An outer skin, such as skin 20, surround each of the six located foam panels and is made of a fibrous material adapted to have resin impregnated therein. An inner mold 26, to be described in connection with FIGS. 2 and 3 is assembled inside of the panels which make up the shelter to be formed.

After the inner mold is in place, a source of pressure 28, which may be any suitable gas, is applied to the inner mold 26. When resin is injected into the system from a source 22 by means of a pump 24, the skin material of all the panels becomes impregnated with the resin. After the resin has been properly cured, a rigid composite external surface is provided around all of the panels which make up the enclosure.

Because all of the details relating to the foam and resin operation are not directly related to the present invention, they are not illustrated in detail. Corresponding patent applications entitled "Electro-Magnetic Interference Shield" assigned to the same assignee as the present invention, filed Aug. 20, 1984, Ser. No. 642,005 and "An Inner Inflatable and Collapsible Mold", filed Aug. 20, 1984, Ser. No. 642,474, relate to features also described herein.

FIG. 2 is an exploded view illustrating some of the main elements involved in the present invention, with some emphasis on the details of one embodiment of an inflatable inner mold which may be used in practicing the present invention. FIG. 2A illustrates a completed enclosure 59 having an opening 61 and illustrates the final product resulting from the means and methods used in the present invention.

The inner mold 26 includes six somewhat similar frame assemblies for six sides of an enclosure each comprising four angle members with some of the angle members being included in more than one frame assembly. All parts making up the assemblies must be assembled individually inside of the six panels such as the foam panels 30, which are pre-located inside of the outer rigid shell 12 which acts as a wall for the outer mold. An opening 61 is provided in one of the panels to permit entry and exit. Means for sealing the openings in the enclosure are not described or illustrated.

After the assemblies for the inner mold 26 are in place within the shell 12, six nylon sheets, such as a sheet 36 are secured to the six frame assemblies. Means for sealing the joining areas and corners of the assemblies are provided, as will be described. The completed sealed frame assemblies with their nylon sheets provide the inner mold of the present invention.

FIG. 2, a typical one of six frame assemblies 34, comprises four angle members 36, 38, 40 and 42. The angle members 36, 38, 40, and 42 are adapted to receive the nylon sheet 32 thereon. Corner elements 44, 46, 48 and 50 are provided to join the angle members 36, 38, 40 and 42 with other joining angle members. Only the frame assembly 34 is described, it being understood that the explanation also applies to other unnumbered frame assemblies and angle elements.

Referring to FIG. 3, there is illustrated a means for joining the various parts to form the inner mold. Only one joint between adjacent frames is illustrated, it being understood that all the frames are joined in a substantially similar manner. After the parts for the frames have been brought into the panels to form the shelter, means are provided to join the frames, formed by the angle members of FIG. 2, and also to join the adjacent nylon film sheets so as to have an inner mold capable of receiving pressure with the joined areas preventing leakage when gas under pressure is pumped into the assembly comprising the inner mold. The inner mold is described in one of the aforementioned copending applications entitled "An Inner Inflatable and Collapsible Mold".

An angle member 11 comprising surfaces 13 and 15 is considered to be typical of all of the angle members illustrated in FIG. 2. After the angle members have been installed (with the foam panels already in place), means for sealing and receiving the nylon sheets are provided.

A strip of nylon 17 having sealants 19 and 21 on opposite sides thereof is inserted on the surfaces 13 and 15 of the angle member 11. The strip 17 with the sealants are pre-made. The nylon strip 17, with its sealants 19 and 21, is applied around all of the angle members, with four such members providing a single frame. The strip 17 provides bridging strength at the corners.

Nylon sheets 23 and 25 are then secured to the layer of sealant 21. After the nylon sheets 23 and 25 are in place, a second pre-made nylon strip 27 having a sealant 29 is secured to the nylon sheets all around the angle members making up the frame assemblies. The multiple sealants and nylon strips assure that the nylon sheets are adequately joined together and not subject to leakage. The nylon strip 27 provides additional bridging strength at the corners. With this arrangement, the possible leakage paths through the sealants at the corners are lengthened.

All of the areas between the corners of the angle members making up the frame assemblies are joined together in the same manner as illustrated in FIG. 3. In the case of the corners when three frames and film sheets meet, additional means are used to join together the three units.

Referring to FIG. 4, three angle members 31, 33 and 35 having a space therebetween is adapted to receive a corner bracket. Tape sections 39, 41 and 43 having sealants on both sides are adapted to sit into the corner bracket 37. The various tape sections 39, 41, and 43 with their sealants are continuations of a tape such as nylon strip 17 with sealants 19 and 21 applied on either side.

The corners of the nylon film sheets 45, 47 and 49 are adapted to fit into the tapes 39, 41 and 43 which include the sealant thereon. Following the installation of the nylon strips, a group of tapes 51, 53 and 55 are inserted. The tape sections 51, 53 and 55 have adhesive applied thereto. The tapes 51, 53 and 55 may be continuations of strips such as strip 27 illustrated in FIG. 3 having a sealant 29.

It is thus seen that the present invention provides adequate sealing where the edges of the nylon sheets join as well as sealing the corners where three areas of the nylon films and frames meet. The multiple layers of sealant and use of nylon strips assures a strong seal to prevent leakage or rupture of the inflatable assembly making up the inner mold when high pressure is applied.

Figure 6:
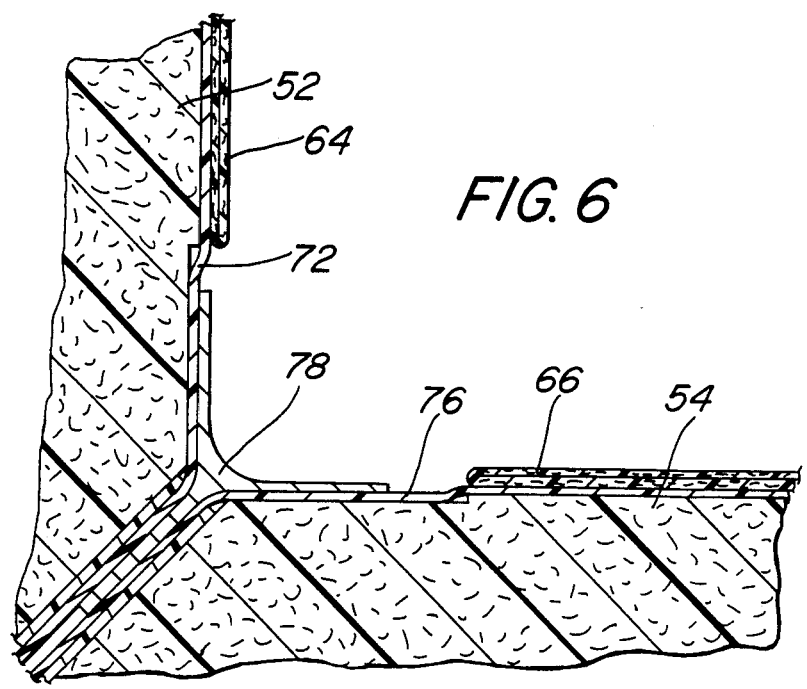
Figure 7:
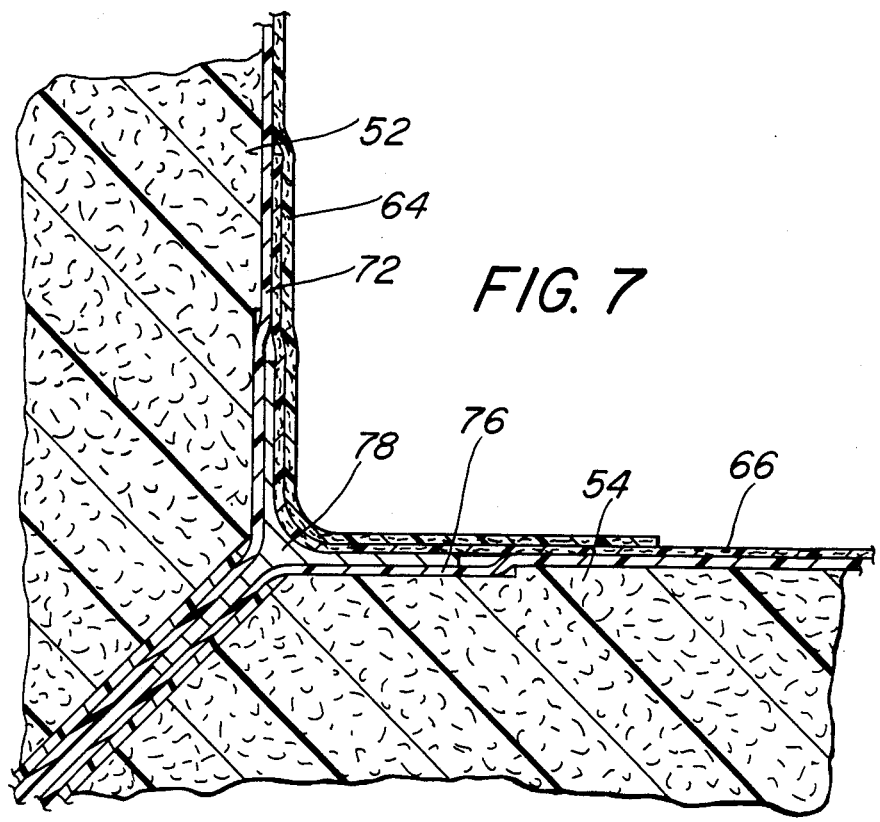

Referring to FIGS. 5, 6 and 7, two of the six foam panels 52 and 54 making up the enclosure are illustrated. These foam panels 52 and 54 include the low and high density foam material therein with only one density being illustrated. The foam panels 52 and 54 are mitered at portions 56 and 58 so that they may be joined at the corners in the manner illustrated in FIG. 5.

FIG. 5 illustrates the two panels 52 and 54 before they are joined together. To insure structural integrity at the outer joint, fiberglass flaps are used on both the inside and outside surfaces of the panels. The outside flaps include fiberglass pieces 60 and 62. The inside flaps include fiberglass pieces 64 and 66 on the panels 52 and 54. In order to position the outside flaps 60 and 62, since fiberglass has a minimal inherent rigidity before resin impregnation, the use of a "helper sheet" 68 positions the flaps against the shell 12, which comprises part of the outer mold while adjacent panels are slid into position. Once the adjacent panels, such as panels 52 and 54, are located, the helper sheet 68 is removed. As illustrated in FIG. 5, the inner fiberglass flaps 64 and 66 are folded out of the way until the corner joint is completed when they are unfolded as illustrated in FIG. 7.

The panel 52 includes an outer fiberglass skin 70 and an inner fiberglass skin 72. Likewise, the panel 54, as well as all the other panels not illustrated, include an outer fiberglass skin 74 and an inner fiberglass skin 76. The skins around the panels may comprise a single piece in some cases.

FIG. 6 illustrates another step in the assembly of the panels in which an aluminum "Y" shaped extrustion 78 is inserted into the corner between the panels. The "Y" member, which may be metal, serves to tie together the inner skins of adjacent panels to provide structural integrity of the inside corners due to internal or external pressure loading. The "Y" member provides a shear tie between the foam cores of the panels and their inner and outer skins at the corners. This essentially provides full rigidity of the panels around the corners.

FIG. 7 illustrates the fiberglass flaps 64 and 66 extended from their folded positions over the extrusion 78. It is seen that the joining areas of adjacent panels have additional reinforcement by using the inner and outer fiberglass flaps.

What is claimed is:
1. A one-piece seamless enclosure comprising:
(a) six panels each including a foam core completely surrounded by fiber reinforced material with one of said panels having an opening therein;
(b) said foam core comprising high density foam foam frames and low density foam material;
(c) each of said panels having mitered edges and being joined together at its edges on adjacent panels to provide a hollow enclosure between said panels;
(d) a "Y" shaped member disposed in corners of said panels to provide rigidity of the panels around said corners, and
(e) said fiber reinforced material completely surrounding the joined panels being impregnated with cured resin to form said one-piece enclosure.

* * * * *